United States Patent
Levy

(10) Patent No.: US 8,959,352 B2
(45) Date of Patent: *Feb. 17, 2015

(54) TRANSMARKING OF MULTIMEDIA SIGNALS

(75) Inventor: Kenneth L. Levy, Stevenson, WA (US)

(73) Assignee: Digimarc Corporation, Beaverton, OR (US)

( * ) Notice: Subject to any disclaimer, the term of this patent is extended or adjusted under 35 U.S.C. 154(b) by 1067 days.

This patent is subject to a terminal disclaimer.

(21) Appl. No.: 12/120,060

(22) Filed: May 13, 2008

(65) Prior Publication Data

US 2008/0279536 A1  Nov. 13, 2008

Related U.S. Application Data

(63) Continuation of application No. 09/810,080, filed on Mar. 16, 2001, now Pat. No. 7,373,513, which is a continuation-in-part of application No. 09/404,292, filed on Sep. 23, 1999, now Pat. No. 7,197,156, (Continued)

(51) Int. Cl.
*H04L 9/00* (2006.01)
*H04L 29/06* (2006.01)
(Continued)

(52) U.S. Cl.
CPC ............ *G06T 1/0028* (2013.01); *H04L 65/607* (2013.01); *H04N 21/23892* (2013.01);
(Continued)

(58) Field of Classification Search
CPC ........... G06F 17/30876; G06K 7/1417; G06K 7/1447; G06K 9/00442; G06K 19/06037; G06K 19/06046; G06K 19/14; G06K 19/18; G06K 2017/0064; G06K 2019/06253; G06Q 20/341; G06Q 20/40145; G06Q 30/02; G06T 1/0021; G06T 1/0028; G06T 1/005; G06T 2201/00
USPC ............. 713/176; 380/201, 217; 386/95, 252, 386/260, 353; 382/100, 232; 726/26
See application file for complete search history.

(56) References Cited

U.S. PATENT DOCUMENTS 4,237,484 A   12/1980  Brown
4,528,588 A    7/1985  Lofberg
(Continued)

FOREIGN PATENT DOCUMENTS

EP    0581317    2/1994
EP    0901282    3/1999
(Continued)

OTHER PUBLICATIONS

U.S. Appl. No. 09/442,441, filed Jan. 17, 1999, Rhoads.
(Continued)

*Primary Examiner* — Baotran N To
(74) *Attorney, Agent, or Firm* — Digimarc Corporation

(57) ABSTRACT

The presently claimed invention relates generally to digital watermarking and data hiding. One claim recites a method including: receiving data representing video, the data comprising at least first digital watermarking embedded therein; decoding the first digital watermarking embedded in the data to obtain a first identifier; and then converting the data into low bandwidth Internet video; and embedding at least the first identifier with digital watermarking into converted low bandwidth Internet video, the identifier identifying at least the video. Of course, other combinations are described, enabled and claimed as well.

12 Claims, 1 Drawing Sheet

Related U.S. Application Data application No. 12/120,060, which is a continuation-in-part of application No. 09/563,664, filed on May 2, 2000, now Pat. No. 6,505,160.

(60) Provisional application No. 60/190,481, filed on Mar. 18, 2000, provisional application No. 60/101,851, filed on Sep. 25, 1998, provisional application No. 60/110,683, filed on Dec. 2, 1998.

(51) Int. Cl.

| | |
|---|---|
| *H04N 21/2389* | (2011.01) |
| *G06F 17/30* | (2006.01) |
| *G06K 19/14* | (2006.01) |
| *G06Q 20/34* | (2012.01) |
| *H04N 1/32* | (2006.01) |
| *H04N 21/8358* | (2011.01) |
| *G06K 7/14* | (2006.01) |
| *G07F 17/16* | (2006.01) |
| *G06K 19/06* | (2006.01) |
| *G06T 1/00* | (2006.01) |
| *G06Q 20/40* | (2012.01) |
| *H04H 20/93* | (2008.01) |
| *G07F 7/10* | (2006.01) |
| *G06Q 30/02* | (2012.01) |
| *G10L 19/018* | (2013.01) |
| *H04N 1/00* | (2006.01) |
| *H04H 20/31* | (2008.01) |
| *G07D 7/00* | (2006.01) |
| *G10L 15/26* | (2006.01) |
| *G07F 7/08* | (2006.01) |
| *H04N 19/61* | (2014.01) |
| *G07F 17/26* | (2006.01) |
| *G07C 9/00* | (2006.01) |
| *G06K 19/18* | (2006.01) |
| *G06K 9/00* | (2006.01) |
| *H04H 60/82* | (2008.01) |
| *G11B 20/00* | (2006.01) |
| *G06K 17/00* | (2006.01) |
| *G11B 20/10* | (2006.01) |
| *H04W 4/00* | (2009.01) |

(52) U.S. Cl.
CPC .... *G06F17/30876* (2013.01); *G11B 20/00007* (2013.01); *G06K 19/14* (2013.01); *G06Q 20/341* (2013.01); *H04N 1/32144* (2013.01); *H04N 21/8358* (2013.01); *H04N 1/32208* (2013.01); *G06K 7/1417* (2013.01); *H04N 2201/3271* (2013.01); *G06K 2017/0064* (2013.01); *H04N 2201/3207* (2013.01); *G11B 20/00115* (2013.01); *G11B 2020/10537* (2013.01); *G07F 17/16* (2013.01); *H04N 1/32251* (2013.01); *H04W 4/00* (2013.01); *G06K 19/06037* (2013.01); *H04N 2201/3233* (2013.01); *G06T 1/005* (2013.01); *G06Q 20/40145* (2013.01); *H04H 20/93* (2013.01); *H04N 1/32203* (2013.01); *G11B 20/00086* (2013.01); *H04N 1/32288* (2013.01); *G11B 20/00891* (2013.01); *H04N 1/32122* (2013.01); *H04N 2201/3276* (2013.01); *H04N 1/32229* (2013.01); *H04N 2201/327* (2013.01); *H04N 2201/3225* (2013.01); *H04N 2201/3226* (2013.01); *G07F 7/1008* (2013.01); *H04N 2201/3249* (2013.01); *G06Q 30/02* (2013.01); *G11B 20/00181* (2013.01); *G11B 20/00884* (2013.01); *H04N 1/32128* (2013.01); *G06K 2019/06253* (2013.01); *G10L 19/018* (2013.01); *H04N 1/00005* (2013.01); *H04H 20/31* (2013.01); *H04N 1/00973* (2013.01); *H04N 1/00079* (2013.01); *G07D 7/002* (2013.01); *G10L 15/265* (2013.01); *G07F 7/086* (2013.01); *G07D 7/004* (2013.01); *G06K 19/06046* (2013.01); *H04N 19/00781* (2013.01); *G07F 17/26* (2013.01); *H04N 1/32106* (2013.01); *G06T 1/0021* (2013.01); *H04N 1/3216* (2013.01); *G07C 9/00079* (2013.01); *H04N 1/32352* (2013.01); *G06K 19/18* (2013.01); *G06K 9/00442* (2013.01); *H04N 2201/3274* (2013.01); *H04N 2201/3205* (2013.01); *H04N 1/00037* (2013.01); *G06T 2201/0051* (2013.01); *G06K 7/1447* (2013.01); *G06T 2201/0052* (2013.01); *H04H 60/82* (2013.01)
USPC .............................. 713/176; 380/201; 726/26

(56) References Cited

U.S. PATENT DOCUMENTS

| | | | |
|---|---|---|---|
| 4,979,210 A | 12/1990 | Nagata et al. | |
| 5,051,929 A * | 9/1991 | Tutt et al. | 345/593 |
| 5,450,490 A | 9/1995 | Jensen et al. | |
| 5,471,533 A | 11/1995 | Wang et al. | |
| 5,510,900 A | 4/1996 | Shirochi et al. | |
| 5,613,004 A | 3/1997 | Cooperman et al. | |
| 5,636,292 A | 6/1997 | Rhoads | |
| 5,646,997 A | 7/1997 | Barton | |
| 5,652,626 A | 7/1997 | Kawakami | |
| 5,659,726 A | 8/1997 | Sandford, II | |
| 5,687,191 A | 11/1997 | Lee et al. | |
| 5,719,937 A | 2/1998 | Warren et al. | |
| 5,721,788 A | 2/1998 | Powell et al. | |
| 5,727,092 A | 3/1998 | Sandford, II | |
| 5,748,763 A | 5/1998 | Rhoads | |
| 5,778,102 A | 7/1998 | Sandford, II | |
| 5,809,139 A | 9/1998 | Girod et al. | |
| 5,832,119 A | 11/1998 | Rhoads | |
| 5,841,978 A | 11/1998 | Rhoads | |
| 5,875,249 A | 2/1999 | Mintzer et al. | |
| 5,901,178 A | 5/1999 | Lee et al. | |
| 5,901,224 A | 5/1999 | Hecht | |
| 5,912,972 A | 6/1999 | Barton | |
| 5,915,027 A * | 6/1999 | Cox et al. | 380/54 |
| 5,930,369 A | 7/1999 | Cox et al. | |
| 5,943,422 A | 8/1999 | Van Wie et al. | |
| 5,947,548 A | 9/1999 | Carper et al. | |
| 5,956,716 A | 9/1999 | Kenner et al. | |
| 5,963,909 A | 10/1999 | Warren et al. | |
| 6,018,369 A | 1/2000 | Patterson | |
| 6,021,196 A | 2/2000 | Sandford et al. | |
| 6,044,182 A | 3/2000 | Daly et al. | |
| 6,049,627 A | 4/2000 | Becker et al. | |
| 6,061,793 A | 5/2000 | Tewfik et al. | |
| 6,122,403 A | 9/2000 | Rhoads | |
| 6,131,161 A | 10/2000 | Linnartz | |
| 6,154,571 A | 11/2000 | Cox et al. | |
| 6,175,639 B1 | 1/2001 | Satoh et al. | |
| 6,185,312 B1 | 2/2001 | Nakamura | |
| 6,192,138 B1 | 2/2001 | Yamadaji | |
| 6,208,745 B1 | 3/2001 | Florencio | |
| 6,233,347 B1 | 5/2001 | Chen et al. | |
| 6,233,684 B1 | 5/2001 | Stefik et al. | |
| 6,243,480 B1 | 6/2001 | Zhao et al. | |
| 6,246,777 B1 | 6/2001 | Agarwal et al. | |
| 6,263,087 B1 | 7/2001 | Miller | |
| 6,266,419 B1 | 7/2001 | Lacy | |
| 6,266,430 B1 | 7/2001 | Rhoads | |
| 6,272,176 B1 | 8/2001 | Srinivasan | |
| 6,272,634 B1 * | 8/2001 | Tewfik et al. | 713/176 |
| 6,275,599 B1 | 8/2001 | Adler | |
| 6,278,791 B1 | 8/2001 | Honsinger | |

(56) References Cited

U.S. PATENT DOCUMENTS

| | | | |
|---|---|---|---|
| 6,282,654 B1 | 8/2001 | Ikeda et al. | |
| 6,285,774 B1 | 9/2001 | Schumann | |
| 6,285,775 B1 | 9/2001 | Wu | |
| 6,298,142 B1 | 10/2001 | Nakano et al. | |
| 6,301,368 B1 | 10/2001 | Bolle | |
| 6,311,214 B1 | 10/2001 | Rhoads | |
| 6,330,672 B1 | 12/2001 | Shur | |
| 6,351,439 B1 | 2/2002 | Miwa | |
| 6,351,815 B1 | 2/2002 | Adams | |
| 6,359,998 B1 | 3/2002 | Cooklev | |
| 6,366,685 B1 | 4/2002 | Takaragi | |
| 6,366,998 B1 | 4/2002 | Mohamed | |
| 6,373,960 B1 | 4/2002 | Conover et al. | |
| 6,374,036 B1 | 4/2002 | Ryan | |
| 6,404,898 B1 | 6/2002 | Rhoads | |
| 6,408,330 B1 | 6/2002 | DeLaHuerga | |
| 6,421,450 B2 | 7/2002 | Nakano | |
| 6,424,726 B2 | 7/2002 | Nakano | |
| 6,425,081 B1 | 7/2002 | Iwamura | |
| 6,434,253 B1 | 8/2002 | Hayashi | |
| 6,434,561 B1 | 8/2002 | Durst, Jr. | |
| 6,437,933 B1 | 8/2002 | Sugiyama et al. | |
| 6,453,304 B1 | 9/2002 | Manabu | |
| 6,463,162 B1 | 10/2002 | Vora | |
| 6,473,516 B1 | 10/2002 | Kawaguchi | |
| 6,480,607 B1 | 11/2002 | Kori | |
| 6,490,681 B1 | 12/2002 | Kobayashi et al. | |
| 6,493,457 B1 | 12/2002 | Quackenbush | |
| 6,504,571 B1 | 1/2003 | Narayanaswami et al. | |
| 6,505,160 B1 | 1/2003 | Levy et al. | |
| 6,535,614 B1 * | 3/2003 | Kimura et al. | 382/100 |
| 6,577,744 B1 | 6/2003 | Braudaway | |
| 6,587,821 B1 | 7/2003 | Rhoads | |
| 6,587,944 B2 * | 7/2003 | Yeung et al. | 713/176 |
| 6,590,997 B2 | 7/2003 | Rhoads | |
| 6,687,383 B1 | 2/2004 | Kanevsky et al. | |
| 6,738,491 B1 | 5/2004 | Ikenoue et al. | |
| 6,738,495 B2 | 5/2004 | Rhoads et al. | |
| 6,775,381 B1 | 8/2004 | Nelson et al. | |
| 6,807,285 B1 | 10/2004 | Iwamura | |
| 6,829,368 B2 | 12/2004 | Meyer et al. | |
| 6,865,676 B1 | 3/2005 | Staring et al. | |
| 6,869,023 B2 | 3/2005 | Hawes | |
| 7,171,018 B2 | 1/2007 | Rhoads et al. | |
| 7,197,156 B1 | 3/2007 | Levy | |
| 7,333,957 B2 | 2/2008 | Levy et al. | |
| 7,349,552 B2 | 3/2008 | Levy | |
| 7,373,513 B2 | 5/2008 | Levy | |
| 7,505,605 B2 | 3/2009 | Rhoads | |
| 7,590,259 B2 | 9/2009 | Levy | |
| 7,593,576 B2 | 9/2009 | Meyer et al. | |
| 7,650,010 B2 | 1/2010 | Levy et al. | |
| 7,711,564 B2 | 5/2010 | Levy et al. | |
| 8,027,507 B2 | 9/2011 | Levy | |
| 8,036,418 B2 | 10/2011 | Meyer et al. | |
| 8,055,899 B2 | 11/2011 | Levy et al. | |
| 8,121,843 B2 | 2/2012 | Rhoads et al. | |
| 8,224,022 B2 | 7/2012 | Levy et al. | |
| 8,244,639 B2 | 8/2012 | Levy | |
| 8,315,554 B2 | 11/2012 | Levy et al. | |
| 8,607,354 B2 | 12/2013 | Levy et al. | |
| 8,611,589 B2 | 12/2013 | Levy | |
| 2001/0016052 A1 * | 8/2001 | Miller | 382/100 |
| 2002/0029338 A1 | 3/2002 | Bloom et al. | |
| 2002/0030907 A1 | 3/2002 | Ikeda et al. | |
| 2002/0036800 A1 | 3/2002 | Nozaki et al. | |
| 2002/0037091 A1 | 3/2002 | Terasaki | |
| 2002/0040323 A1 | 4/2002 | Lee et al. | |
| 2002/0040433 A1 | 4/2002 | Kondo | |
| 2002/0049580 A1 | 4/2002 | Kutaragi et al. | |
| 2002/0064298 A1 | 5/2002 | Rhoads et al. | |
| 2002/0071556 A1 | 6/2002 | Moskowitz et al. | |
| 2002/0078178 A1 | 6/2002 | Senoh | |
| 2002/0080997 A1 | 6/2002 | Rhoads et al. | |
| 2002/0083324 A1 | 6/2002 | Hirai | |
| 2002/0097891 A1 | 7/2002 | Hinishi | |
| 2002/0106082 A1 | 8/2002 | Kori et al. | |
| 2002/0107803 A1 | 8/2002 | Lisanke et al. | |
| 2002/0114456 A1 | 8/2002 | Sako | |
| 2002/0124173 A1 | 9/2002 | Stone | |
| 2002/0133818 A1 | 9/2002 | Rottger | |
| 2002/0150165 A1 | 10/2002 | Huizer | |
| 2002/0164048 A1 | 11/2002 | Bruckstein | |
| 2003/0035565 A1 * | 2/2003 | Rhoads | 382/100 |
| 2003/0101141 A1 | 5/2003 | Iwamura | |
| 2003/0185417 A1 | 10/2003 | Alattar | |
| 2004/0015362 A1 | 1/2004 | Rhoads | |
| 2004/0022412 A1 | 2/2004 | Iwamura et al. | |
| 2004/0101137 A1 * | 5/2004 | Koto et al. | 380/201 |
| 2004/0117629 A1 | 6/2004 | Koto et al. | |
| 2008/0249961 A1 | 10/2008 | Harkness | |

FOREIGN PATENT DOCUMENTS

| | | |
|---|---|---|
| EP | 0906700 | 4/1999 |
| EP | 1156662 | 7/2000 |
| WO | WO9626494 | 8/1996 |
| WO | WO9743736 | 11/1997 |
| WO | WO9827510 | 6/1998 |
| WO | WO99/18723 | 4/1999 |
| WO | WO00/48154 | 8/2000 |
| WO | WO00/54453 | 9/2000 |
| WO | WO01/71960 | 9/2001 |
| WO | WO0171960 | 9/2001 |
| WO | WO01/76253 | 10/2001 |
| WO | WO02/03385 | 1/2002 |
| WO | WO02/37489 | 5/2002 |

OTHER PUBLICATIONS

U.S. Appl. No. 09/480,391, filed Jan. 11, 2000, Tewfik.
U.S. Appl. No. 09/404,292, filed Aug. 28, 2002, Levy.
U.S. Appl. No. 10/383,156, filed Mar. 5, 2003, Rhoads.
U.S. Appl. No. 09/404,291, filed Sep. 29, 1999, Levy.
U.S. Appl. No. 09/404,292, filed Sep. 29, 1999, Levy.
U.S. Appl. No. 09/810,079, filed Mar. 16, 2001, Levy et al.
U.S. Appl. No. 60/101,851, filed Sep. 25, 1998, Levy.
U.S. Appl. No. 60/110,683, filed Dec. 2, 1998, Levy.
U.S. Appl. No. 60/114,725, filed Dec. 31, 1998, Levy.
U.S. Appl. No. 60/126,591, filed Mar. 26, 1999, Levy.
U.S. Appl. No. 60/123,587, filed Mar. 10, 1999, Levy.
U.S. Appl. No. 60/126,592, filed Mar. 26, 1999, Levy.
U.S. Appl. No. 60/190,481, filed Mar. 18, 2000, Levy et al.
Macq, "Cryptology for Digital TV Broadcasting," Proceedings of the IEEE, vol. 83, No. 6, Jun. 1995, pp. 944-957.
EP 01920399.1 search report dated Jun. 14, 2005, 5 pages.
Boland et al., "Watermarking Digital Images for Copyright Protection," Jul. 1995, Fifth International Conference on Image Processing and its Applications, Conf. Publ. No. 410, p. 326-330.
Boney et al., "Digital Watermarks for Audio Signals," IEEE Int. Conf. on Multimedia Computing and Systems, Jun. 17-23, 1996, Hiroshima, Japan.
Bors et al., "Image Watermarking Using DCT Domain Constraints," Sep. 1996, Proc. IEEE Int. Conf. On Image Processing, vol. 3, pp. 231-234.
Koch et al., "Copyright Protection for Multimedia Data," Fraunhofer Institute for Computer Graphics, Dec. 1994.
Gerzon et al., "A High-Rate Buried-Data Channel for Audio CD," J. Audio Eng. Soc., Jan./Feb. 1995, pp. 3-22, vol. 43, No. 1/2, New York.
Hartung, et al., "Digital Watermarking of Raw and Compressed Video," Digital Compression Technologies and Systems for Video Communication, pp. 205-213, Oct. 1996.
Holliman et al., "Adaptive Public Watermarking of DCT-Based Compressed Images," Dec. 1997, SPIE vol. 3312, pp. 284-295.
Hsu et al., "Hidden Signatures in Images," Sep. 1996, Proc. IEEE Int. Conf. On Image Processing, vol. 3, pp. 223-226.
International Search Report from PCT US01/08315 (published as WO 01/71960), dated Jul. 3, 2001 (2 pages).

(56) References Cited

OTHER PUBLICATIONS

Koch, "Copyright Protection for Multimedia Data," Dec. 1994, Proc. Of the Int. Conf. On Digital Media and Electronic Publishing, Leeds, U.K., 15 pages.

Komatsu, "A Proposal on Digital Watermark in Document Image Communication and Its Application to Realizing a Signature," Nov. 1990, Electronics and Communications in Japan, Part 1, vol. 73, No. 5, pp. 22-33.

Komatsu, "Authentication System Using Concealed Image in Telematics," Oct. 1998, Memoirs of the School of Science and Engineering, Waseda Univ., No. 52, pp. 45-60.

Matsui, "Video-Steganography: How to Secretly Embed a Signature in a Picture," Apr. 1993, Proc. Technological Strategies for Protecting Intellectual Property in the Networked Multimedia Environment, vol. 1, issue 1, Jan. 1994, pp. 187-205.

Macq et al., "Cryptology for Digital TV Broadcasting," Proc. of the IEEE, vol. 83, No. 6, Jun. 1995.

Mintzer et al., "Safeguarding Digital Library Contents and Users," D-Lib Magazine, Dec. 1997, 12 pages.

Tanaka, "A Visual Retrieval System With Private Information for Image Database," Oct. 1991, Proceeding Int. Conf. On DSP Applications and Technology, 415-421.

Zhao et al, "Embedding Robust Labels into Images for Copyright Protection," Aug. 1995, Proc. Of the International Congress on Intellectual Property Rights for Specialized Information, Knowledge and New Technologies, 10 pages.

Jun. 3, 2005, Notice of Allowance; Dec. 8, 2004, Office Action; May 3, 2004, Office Action; May 9, 2005, Amendment, all in assignee's U.S. Appl. No. 09/404,292.

Kim, W.G., et al., "A watermarking scheme for both spatial and frequency domain to extract the seal image without the original image," Proc. $5^{th}$ Int. Symp. On Signal Processing and its Applications, Aug. 1999, pp. 293-296.

Ohnishi J. et al., "A method of watermarking with multiresolution analysis and pseudo noise sequence," Systems and Computers in Japan, vol. 29, No. 5, May 1998, pp. 11-19.

Jan. 13, 2006 Notice of Allowance and Aug. 30, 2005 Amendment Accompanying Request for Continued Examination, each from assignee's U.S. Appl. No. 09/404,292.

\* cited by examiner

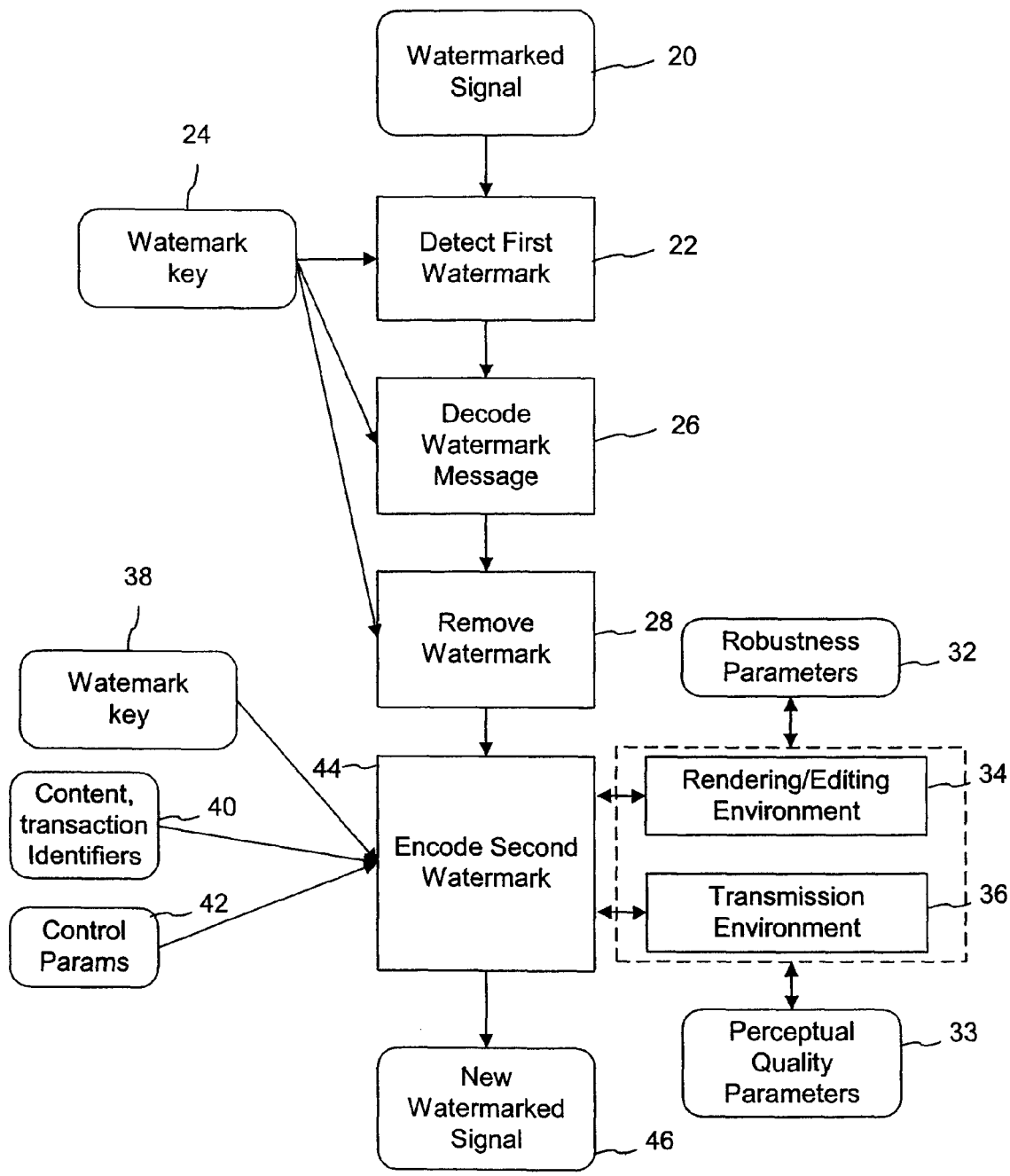

TRANSMARKING OF MULTIMEDIA SIGNALS

RELATED APPLICATION DATA

This application is a continuation of U.S. patent application Ser. No. 09/810,080, filed Mar. 16, 2001 (U.S. Pat. No. 7,373,513), which claims the benefit of U.S. Provisional Patent Application No. 60/190,481, filed Mar. 18, 2000.

The Ser. No. 09/810,080 application is a continuation-in-part of U.S. patent application Ser. No. 09/404,292, filed Sep. 23, 1999 (U.S. Pat. No. 7,197,156), which claims the benefit of U.S. Provisional Application Nos. 60/101,851, filed Sep. 25, 1998, and 60/110,683, filed Dec. 2, 1998.

The Ser. No. 09/810,080 application is also a continuation-in-part of U.S. patent application Ser. No. 09/563,664, filed May 2, 2000 (U.S. Pat. No. 6,505,160).

Each of the above patent documents is hereby incorporated by reference.

TECHNICAL FIELD

The invention relates to multimedia signal processing, for example, steganography, digital watermarking and data hiding.

BACKGROUND AND SUMMARY

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed, and, for robust watermarks, the goal is to design an imperceptible watermark that survives transformation. However, this cannot always be accomplished. The reader is presumed to be familiar with the literature in this field. Particular techniques for embedding and detecting imperceptible watermarks in media signals are detailed in the assignee's co-pending application Ser. No. 09/503,881 (U.S. Pat. No. 6,614,914) and U.S. Pat. No. 5,862,260, which are hereby incorporated by reference.

The invention provides methods and related systems, devices and software for transmarking media signals. Transmarking relates to converting auxiliary data embedded in a media signal from one digital watermark format to another. It is used in processes that transform the media signal, such as compression, broadcast, editing, rendering, etc., to change the characteristics of the embedded watermark so that the watermark has improved robustness or perceptibility characteristics for its new environment. In some cases, transmarking can be extended to cases where out-of-band data file the header or footer of a media file, or other metadata provided with the media file is transmarked into a watermark or is derived from a watermark. Thus, the watermarks appear to be robust to all transformations.

One aspect of the invention is a method of transmarking a media signal previously embedded with a first digital watermark using a first digital watermark embedding method. This transmarking method detects the first digital watermark in the media signal. It then embeds message information from the first digital watermark into a second digital watermark in the media signal before the media signal undergoes a transformation process. The second digital watermark is adapted to survive the transformation process.

Another aspect of the invention is another method of transmarking a media signal. This method detects the first digital watermark in the media signal, converts the media signal to a different format, and embeds message information from the first digital watermark into a second digital watermark in the converted media signal. The second digital watermark is adapted to robustness or perceptibility parameters associated with the new format.

Further features will become apparent with reference to the following detailed description and accompanying drawings.

BRIEF DESCRIPTION OF THE DRAWINGS

FIG. 1 is a diagram illustrating a transmarking process where a first digital watermark in a media signal is transmarked into a second digital watermark in the media signal.

DETAILED DESCRIPTION

In many applications, a digital watermark signal embedded in media signals like audio, video and still images can be changed when the signal is transformed. Transmarking of the digital watermark may be used to change the embedded digital watermark technique at signal transformation points to be compatible with the new signal.

For example, when playing DVD audio over the radio, analog or digital radio, the watermark can be retrieved and re-embedded at a higher level or using a different technique at the broadcast location. Additionally, the watermark could be modified at a repeater station due to the increased noise level in the signal. This way an audio application can retrieve the watermark, while the original DVD can have the lowest change in perception due to the watermark as possible. More specifically, the audio application may be retrieving the watermark in a noisy room and artist won't complain that the DVD watermark ruins their recording.

This is a continuation of the subject matter in US Patent Application, Ser. No. 09/404,292, filed Sep. 23, 1999 (U.S. Pat. No. 7,197,156), which was based upon Provisional Applications Ser. Nos. 60/101,851 and 60/110,683 filed Sep. 25, 1998 and Dec. 2, 1998, respectively, all included herein by reference. These patent applications discussed changing the watermark type when audio was converted from raw PCM format to a compressed, such as MP3, AAC, Real, Liquid or other similar format.

This method also applies to video signals. For example, when watermarked DVD video is transferred to low bandwidth Internet video, such as provided by Real Networks, the DVD watermark is read and increased in amplitude or re-embedded to survive the massive compression needed to stream video over low bandwidth. This watermark may be used for copy protection, but could also be used to enable links or information about the video.

In some applications, it may be useful to convert auxiliary information embedded in a media signal from one format to another. This converting process is another application of transmarking. Transmarking may include converting an out of band identifier like a tag in a header/footer to a watermark or vice versa. It may also involve converting a message in one watermark format to another. The process involves a decoding operating on an input media object, and an encoding of the decoded information into the media object. It may also involve a process for removing the mark originally in the input object to avoid interference with the newly inserted mark.

There are a variety of reasons to perform transmarking. One is to make the embedded information more robust to the types of processing that the media object is likely to encounter, such as converting from one watermark used in packaged media to another watermark used in compressed, and electronically distributed media, or a watermark used in radio or wireless phone broadcast transmission applications.

This type of transmarking process may be performed at various stages of a media object's distribution path. An identifier in a watermark or file header/footer may be encoded at the time of packaging the content for distribution, either in an electronic distribution format or a physical packaged medium, such as an optical disk or magnetic memory device. At some point, the media signal may be converted from one format to another. This format conversion stage is an opportunity to perform transmarking that is tailored for the new format in terms of robustness and perceptibility concerns. The new format may be a broadcast format such as digital radio broadcast, or AM or FM radio broadcast. In this case, the identifier may be transmarked into a watermark or other metadata format that is robust for broadcast applications. The new format may be a compressed file format (e.g., ripping from an optical disk to an MP3 format). In this case, the identifier may be transmarked into a file header/footer or watermark format that is robust and compatible with the compressed file format.

The transmarking process may leave an existing embedded identifier in tact and layer an additional identifier into the media object. This may include encoding a new watermark that does not interfere with an existing watermark (e.g., insert the new watermark in unmarked portions of the media object or in a non-interfering transform domain). It may also include adding additional or new identifier tags to headers or footers in the file format.

FIG. 1 is a flow diagram illustrating a process of transmarking. The input to the transmarking process is a digitally watermarked signal 20, such as an audio signal (e.g., a music track), a video signal, or still image. The digital watermark carries a message payload of one or more symbols (e.g., binary or M-ary symbols) conveying information such as a content identifier, transaction identifier, database index, usage or copy control parameters (flags instructing a device or process not to copy, copy once, not to transfer, etc.). There are a variety of applications for digital watermarks in multimedia content, including forensic tracking, broadcast monitoring, copy control, and using the watermark as a trigger for or link to interactive content to be rendered along with the watermarked signal, either in response to user input or automatically as the watermarked signal is playing. Some of these applications are discussed in co-pending patent application Ser. No. 09/571,422 (U.S. Pat. No. 6,947,571), Ser. No. 09/563,664 (U.S. Pat. No. 6,505,160), Ser. Nos. 09/574,726, and 09/597,209 (U.S. Pat. No. 6,411,725) which are hereby incorporated by reference.

In these applications, there are a number of reasons to transmark the watermark signal embedded in a host signal. Some examples include: to increase the robustness of the watermark as it undergoes a format change (such as for compression, transmission, digital to analog conversion, up-sampling or down-sampling, printing, display, etc.), to reduce the perceptibility of the watermark before playback, or to balance the trade-off of perceptibility levels vs. robustness levels of the watermark signal for a new as the host signal undergoes a change from one format to another.

The transmarking process illustrated in FIG. 1 begins by detecting a first watermark in the watermarked signal (22). A watermark detector employs a watermark key to identify the presence of a watermark. The specific operation of the detector depends on the watermarking process employed. In many techniques, the watermark key specifies the spatial, time, and/or frequency domain location of the watermark signal. It may also specify how to decode a message that has been modulated with a pseudo-random number (e.g., frequency or phase hopping, spread spectrum modulation). To simplify the search for the watermark, the watermark detector searches for reference signal attributes of the embedded signal, such as a known sequence of embedded symbols, or a known signal pattern in a particular time, space, or transform domain. These attributes enable the detector to determine whether a watermark is present in a suspect signal, and to determine its position within the time, space and/or transform domain.

Next, the watermark detector may optionally decode an embedded message (26), such as copy control parameters, content identifiers, owner identifiers, transaction identifiers, etc. This step is optional because the initial detection operation may convey enough information to trigger the remainder of the transmarking operation. For example, the mere detection of the presence of a watermark signal at a particular time, space, or transform domain location may convey one or more bits of message information.

Some examples will help illustrate the detection and message decoding process. One type of watermark embedding process encodes symbols by inserting scaled-amplitude, shifted versions of the host signal. The shift may be a combination of time, frequency, and/or spatial shifts of the host signal depending on the nature of the signal (e.g., time-frequency for audio, spatial frequency for imagery). This shifted version conveys message symbol values by the presence or absence of the shifted version or versions at a particular shift relative to the host, and/or by the amount of change effected to a statistical characteristic of the host signal by the embedding of the shifted version. Another type of embedding process embeds a watermark by modulating perceptual domain samples and/or transform domain frequency coefficients. In both cases, the message may be randomized by applying a pseudo randomizing process (e.g., spreading a message by multiplying or XORing with a PN sequence) before making the changes to the host to hide the resulting message sequence in the host signal. The message may be embedded by an additive process of a modifying signal and/or by a quantization of sample values, frequency coefficient values, or statistical characteristic values.

In these embedding techniques, the detector looks for attributes of the watermark signal, such as by using correlation or a statistical analysis to detect the shifted versions or modulated samples/coefficients. By identifying evidence of known symbols or watermark signal attributes, the detector determines whether a watermark signal is present. In some cases, the watermark detector determines that an additional message payload message is present based on the detection of certain watermark signal attributes. It then proceeds to decode additional signal attributes and map them to message symbols. Further error correction decoding may be employed, such as BCH, turbo, Reed Solomon, and convolution decoding, to extract the message payload.

Next, the transmarking process removes the first watermark signal (28). Again, this process is optional because the transmarking process may proceed by embedding a second watermark without specifically attempting to remove or mitigate the effects of the first. Once the watermark detector has detected the watermark and determined its temporal, spatial, and/or frequency domain position, it can remove the watermark or mitigate its effect. It can substantially remove the watermark in cases where the embedding function is invertable, such as a reversible addition operation, by performing the inverse of the embedding function using the watermarking key to specify the attributes and location of the first watermark. It can also remove the watermark without knowing the inverse function, such as using a whitening filter with PN sequence based watermarking.

Interestingly, this could allow a less perceptible watermark to be added to content that is going from a low quality medium to a higher quality medium. Although the content will still be the quality of the original medium, the watermark will produce minimal or no further quality degradation. When transforming from high quality to lower quality medium, removing the first watermark still improves quality and robustness due to reducing interference between each watermark.

In some applications, the watermarked signal may be converted to another format, such as compressing the signal before the transmarking process proceeds. These applications are ones where the signal in the new format is available for watermarking. In this case, the transmarking process proceeds by embedding a second watermark into the host signal after the format change has occurred. This enables the watermark embedding process to adapt the watermark to the perceptual quality and robustness parameters of the signal in the new format. In other applications, such as where the signal is broadcast, it is difficult or not practically possible to intercept the signal for embedding a new watermark after the format change occurs. For example, the format change may occur as a result of the broadcast transmission. In this case, the transmarking process proceeds to embed a second watermark and adapts the watermark to the robustness and perceptual quality parameters appropriate for the new format of the signal before the format change occurs.

Next, the transmarking process encodes the second watermark (44) using the same or some different embedding process as the first watermark (30). This second watermark can be added before the transformation, after the transformation, or during the transformation with a feedback loop. For example, the first watermark may be embedded by adding a shifted version of the host signal, while the second watermark may be embedded by adding a perceptually adapted pseudo random carrier signal in the perceptual or some transform domain (like Fourier, DCT, wavelet, etc.), or vice versa. The second watermark may modify different temporal, spatial or frequency portions of the host signal than the first, or the two watermarks may overlap in one or more of these portions of the signal. Regardless of whether the watermark embedding function is fundamentally the same or different as the one used to embed the first watermark, this embedding process (30) is specifically adapted to the perceptibility and robustness constraints of the new format or environment. This watermark embedding process uses robustness parameters (32) (e.g., watermark signal gain, extent of redundancy, frequency domain locations) to specify the watermark strength, redundancy and frequency domain locations that particularly adapt the watermark for survival in the new format. This second watermark may add new information about the transformation where this information can be used for forensic tracking. The information could include any combination of the following: an identifier of the transformation device (such as an MPEG encoder device or manufacturer), and an identification of the distribution system, such as an identifier of the broadcast network or cable system. This new information augments the original information embedded into the first watermark and does not alter its meaning, but instead, adds additional payload information.

To ensure that the second watermark satisfies robustness constraints, the embedding process optionally applies a feedback path that applies the watermarked signal to a degradation process, then measures the number of errors incurred in decoding a known message, and selectively increases the gain of the watermark signal in the portions (temporal, spatial or frequency portions) of the signal where the errors occurred. The degradation operations may include a compression operation, or an operation that models degradation likely to be encountered in the new format, such as digital to analog conversion, printing/scanning, broadcast transmission, time scale changes, etc. This process repeats until the measured error rate falls below an acceptable threshold.

In addition, the embedding process uses perceptual quality parameters 33 that specify constraints on perceptual quality of the signal for the new format. These parameters may specify limits on the watermark strength, or define a perceptibility threshold that can be measured automatically, like Peak Signal to Noise Ratio, typically used in analysis of digital watermarking methods. Again, as above, the embedding process optionally includes a feedback path that measures the perceptual quality of the watermarked signal and selectively reduces the gain of the signal in the portions of the signal (temporal, spatial or frequency portions) where the watermarked signal exceeds the perceptibility threshold.

FIG. 1 graphically depicts the interaction between the watermark embedding process 30, on the one hand, and the rendering/editing environment or transmission environments (34, 36) on the other. This diagram depicts how the embedder adapts the new watermark to the environment in which the transmarked signal will be used. For example, if the signal is a still image that is being used in a photo editing software environment, the robustness of the watermark can be adapted to the image processing operations in the editing tool. If the watermark is going to need to survive printing, then the transmarking process embeds the signal with a new watermark designed to survive that process and be recoverable via an image scanned from the printed image. In this case, the watermark embedder may include additional calibration signal information as set forth in U.S. Pat. No. 5,862,260 to ensure that the watermark can be detected despite geometric distortion.

As an aside, just as the second watermark may be adapted to the intended environment, the operations in the editing tool can be modified so as to improve the survivability of the watermark. In this case, the image editing operations such as blurring, color transformation, etc. are adapted to preserve the watermark signal to the extent possible. In particular, a low pass filter or blur operation that typically reduces high frequency components may be implemented so as to pass selected high frequency components to maintain the watermark signal in those components. The operation of adding guassian noise may be modified by shaping or reducing the noise at certain frequencies to reduce interference with the watermark signal at those frequencies. In cases where watermarks are inserted by modifying a particular color channel such as luminance, the color transform operations may be designed to preserve the luminance of the watermarked image.

Further, the signal editing tool may be integrated with the transmarking process to decode the watermark before an operation, and then re-encode the watermark after an operation to ensure that it is preserved. For example, the wateramark may be re-applied after the image editing tool is used to make an affine transform of an image, or after the image is cropped.

In the case of transmission of media signals over a communication channel, the watermark may be transmarked at points in the communication channel where the signal (audio, video, or image signal) is transformed. These include cases where the signal is un-compressed and re-compressed in another format, where the signal is transformed in a router or repeater (e.g., when the signal is amplified in a router or repeater node in the communication path, the watermark is transmarked at higher intensity), where the signal is transformed into packets in a switching network, the watermark signal may be decoded and re-encoded in the individual packets, or re-encoded after the signal is re-combined. The re-encoding is effected by transferring a watermarking command in the header of the packets specifying the watermark payload and watermark embedding protocol to be used in the re-combined signal.

In audio and video compression codecs, the transmarking process may be integrated into the compression codec. This enables the codec to modify the compression operation or modify the bitrate to ensure that the watermark survives. In the first case, the compression codec may be designed to preserve certain frequency components that would otherwise be substantially reduced to preserve the watermark. In the latter case, the codec selects a bit rate at which the watermark survives, yet the signal has been compressed to an acceptable level.

If the watermarked signal is going to be rendered in a high fidelity device where usage is tightly controlled, such as a DVD player, the second watermark can be embedded so as to have less impact on perceptibility. Conversely, if the watermarked signal is going to be rendered in a lower fidelity device, such as a personal computer, the second watermark can be embedded so that it is more robust while staying within the perceptual quality parameters of the rendering device. In addition, the watermark can be changed if DVD audio masters are converted to CDs or cassette tapes.

If the watermarked signal is going to be transmitted, such as in the broadcast environment, the embedding process encodes the second watermark with robustness to survive the broadcast and maintain the perceptual fidelity within the less rigid constraints of the broadcast environment. The transmarking process can be used to encode triggers used in interactive video or audio. The triggers may be originally encoded in one format and transmarked into another format before broadcast, or at some node in the broadcast process. For example, the trigger can transmarked in video when it is compressed into MPEG2 format for broadcast, or when the content is received at a cable head-end or node in the content distribution channel. The trigger may be a network address of interactive content like an IP address or URL, or an index to a network address, interactive content like HTML or XML, etc.

As another example, triggers for interactive content in radio broadcasts can be transmarked when the content is transferred from a packaged medium, such as an optical disk, and prepared for broadcast over traditional radio broadcast, digital satellite broadcast, or Internet streaming broadcast.

Like the first watermark, this second watermark employs a watermarking key 38 to specify the spatial, time and or frequency attributes of the second watermark. In addition, the message decoded from the first watermark, such as an identifiers 40, copy control parameters 42 are embedded.

The result of the transmarking process, in a typical case, is a new watermarked signal 46. As noted, the information or function of the watermark may be transmarked to out-of-band data like a file header or footer, such as an ID3 tag in MP3 audio. Conversely, out-of-band data may be transmarked into in-band data that is embedded into the host signal using a digital watermarking process.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

What is claimed is:

1. A method comprising:
receiving data representing video, the data comprising at least first digital watermarking embedded therein;
using a processor, decoding the first digital watermarking embedded in the data to obtain a first identifier in which said decoding utilizes a watermark decoding key; and then
converting the data into low bandwidth Internet video;
using the processor, embedding at least the first identifier, obtained from said act of decoding the first digital watermarking embedded in the data, with second digital watermarking into converted low bandwidth Internet video, the first identifier identifying at least the video, in which said embedding utilizes a watermarking embedding key and robustness parameters.

2. The method of claim 1 further comprising embedding a second identifier in the converted low bandwidth Internet video data with third digital watermarking.

3. The method of claim 2 wherein the second identifier is associated with a transaction.

4. The method of claim 2 wherein the second identifier is associated with a data conversion.

5. An apparatus comprising:
electronic memory for storing data representing video, the data comprising at least first digital watermarking embedded therein;
a processor programmed for:
utilizing a watermarking decoding key, decoding the first digital watermarking embedded in the data to obtain a first identifier; and then converting the data into low bandwidth Internet video;
utilizing a watermarking embedding key and robustness parameters, embedding at least the first identifier, obtained from said decoding the first digital watermarking embedded in the data, with second digital watermarking into converted low bandwidth Internet video, the identifier identifying at least the video.

6. The apparatus of claim 5 in which the processor is further programmed for embedding a second identifier in the converted low band width Internet video data with third digital watermarking.

7. The apparatus claim 6 wherein the second identifier is associated with a transaction.

8. The apparatus of claim 6 wherein the second identifier is associated with a data conversion.

9. A non-transitory computer readable medium comprising instructions stored thereon that when executed cause a processor to perform the following:
controlling data representing video, the data comprising at least first digital watermarking embedded therein;
utilizing a watermarking decoding key, decoding the first digital watermarking embedded in the data to obtain a first identifier; and then
converting the data into low bandwidth Internet video;
utilizing a watermarking embedding key and robustness parameters, embedding at least the first identifier, obtained from said act of decoding the first digital watermarking embedded in the data, with second digital watermarking into converted low bandwidth Internet video, the first identifier identifying at least the video.

10. The non-transitory computer readable medium of claim 9 in which the instructions that when executed further cause the processor to preform: embedding a second identifier in the converted low bandwidth Internet video data with third digital watermarking.

11. The non-transitory computer readable medium of claim 10 in which the second identifier is associated with a transaction.

12. The non-transitory computer readable medium of claim 10 in which the second identifier is associated with a data conversion.

\* \* \* \* \*